US012769454B2

(12) United States Patent
Song

(10) Patent No.: US 12,769,454 B2
(45) Date of Patent: Oct. 20, 2026

(54) MEMORY DEVICE, MEMORY SYSTEM, AND OPERATING METHOD OF THE MEMORY DEVICE

(71) Applicant: SK hynix Inc., Gyeonggi-do (KR)

(72) Inventor: Choung Ki Song, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 84 days.

(21) Appl. No.: 18/676,525

(22) Filed: May 29, 2024

(65) Prior Publication Data

US 2025/0251865 A1 Aug. 7, 2025

(30) Foreign Application Priority Data

Feb. 7, 2024 (KR) ........................ 10-2024-0018699

(51) Int. Cl.
*G06F 3/06* (2006.01)

(52) U.S. Cl.
CPC .......... *G06F 3/0617* (2013.01); *G06F 3/0659* (2013.01); *G06F 3/0673* (2013.01)

(58) Field of Classification Search
CPC ..... G06F 3/0659; G06F 3/0673; G06F 3/0619
See application file for complete search history.

(56) References Cited

U.S. PATENT DOCUMENTS 10,007,579 B2 * 6/2018 Shaw .................... G06F 3/0619
10,157,657 B2 * 12/2018 Zheng .................. G11C 11/406
12,640,175 B2 * 5/2026 Song ...................... G11C 7/109
2017/0322740 A1 * 11/2017 Gabryjelski ............ G06F 3/067
2019/0392886 A1 * 12/2019 Cox .................... G11C 11/4093
2022/0139448 A1 5/2022 Kim et al.
2023/0206981 A1 * 6/2023 Kim .................. G11C 11/40611 365/222
2023/0385208 A1 * 11/2023 Sethuraman ........ G06F 13/1668
2024/0378143 A1 * 11/2024 Song ................... G06F 13/4282
2025/0252985 A1 * 8/2025 Song .................. G11C 29/4401

FOREIGN PATENT DOCUMENTS

KR 10-2023-0076680 A 5/2023

OTHER PUBLICATIONS

Method for an enhanced self-refresh exit command—Retrieved from ip.com; 6 Pages; Dated Dec. 16, 2005 (Year: 2005).*

* cited by examiner

*Primary Examiner* — Brian T Misiura
(74) *Attorney, Agent, or Firm* — IP&T GROUP LLP

(57) ABSTRACT

A memory system may include a memory device, a controller configured to control the memory device through an in-band interface, and a baseboard management controller configured to control the memory device through a side-band interface. The memory device is configured to enter a self-refresh mode based on in-band signals that are received through the in-band interface and to terminate a self-refresh mode based on side-band signals that are received through the side-band interface.

17 Claims, 5 Drawing Sheets

MEMORY DEVICE, MEMORY SYSTEM, AND OPERATING METHOD OF THE MEMORY DEVICE

CROSS-REFERENCE TO RELATED APPLICATION

This application claims priority under 35 U.S.C. § 119 to Korean Patent Application No. 10-2024-0018699 filed on Feb. 7, 2024, which is incorporated herein by reference in its entirety.

BACKGROUND

1. Technical Field

Embodiments of the present disclosure relate to an integrated circuit technology and, more particularly, to a memory device, a memory system, and an operating method of the memory device.

2. Related Art

Recently, as an electronic device is reduced in size, has lower power consumption and higher performance, and is diversified, a memory device capable of storing information is required for various electronic devices, such as computers and portable communication devices.

The memory device is mounted and used in a memory system. If the memory device is not used in the memory system, the memory device enters a standby state (e.g., a self-refresh mode).

Research for reducing the time that is taken until the memory device switches from the standby state to an active state in which the memory device operates normally is continued.

SUMMARY

In an embodiment of the present disclosure, a memory system may include a memory device, a controller configured to control the memory device through an in-band interface, and a baseboard management controller configured to control the memory device through a side-band interface, wherein the memory device is configured to enter a self-refresh mode based on in-band signals that are received through the in-band interface and to terminate a self-refresh mode based on side-band signals that are received through the side-band interface.

In an embodiment of the present disclosure, a memory device may include a reception circuit configured to receive in-band signals from a controller through an in-band interface, a first command decoding circuit configured to generate a normal command by decoding the output of the reception circuit, a transmission and reception circuit configured to transmit and receive side-band signals to and from a baseboard management controller through a side-band interface, a second command decoding circuit configured to generate a setting command by decoding the output of the transmission and reception circuit, a mode register set configured to store setting information based on the setting command and output, as a setting signal, the stored setting information, and at least one internal circuit configured to operate based on the normal command and the setting signal.

In another embodiment of the present disclosure, an operating method of a memory device may include entering a standby state based on in-band signals that are received through an in-band interface, generating a setting command by decoding side-band signals that are received through a side-band interface, outputting setting information that has been stored in a mode register set based on the setting command, and switching from the standby state to an active state based on the setting information.

In another embodiment of the present disclosure, an operating method of a memory device may include entering a self-refresh mode based on in-band signals that are received through an in-band interface, deactivating at least one reception circuit for receiving the in-band signals based on the entering of the self-refresh mode, receiving a termination command in the self-refresh mode through a side-band interface, activating the reception circuit that has been deactivated in response to the reception of the termination command, and terminating the self-refresh mode in response to the termination command.

DETAILED DESCRIPTION

Hereinafter, embodiments according to the technical spirit of the present disclosure are described with reference to the accompanying drawings.

Embodiments of the present disclosure may provide a memory device, a memory system, and an operating method of the memory device, which can reduce the time that is taken until the memory device switches from a power-off state or a standby state to an active state.

It is possible to increase user satisfaction because the time that is taken for the memory device to switch from the power-off state or the standby state to the active state can be reduced.

Figure 1:
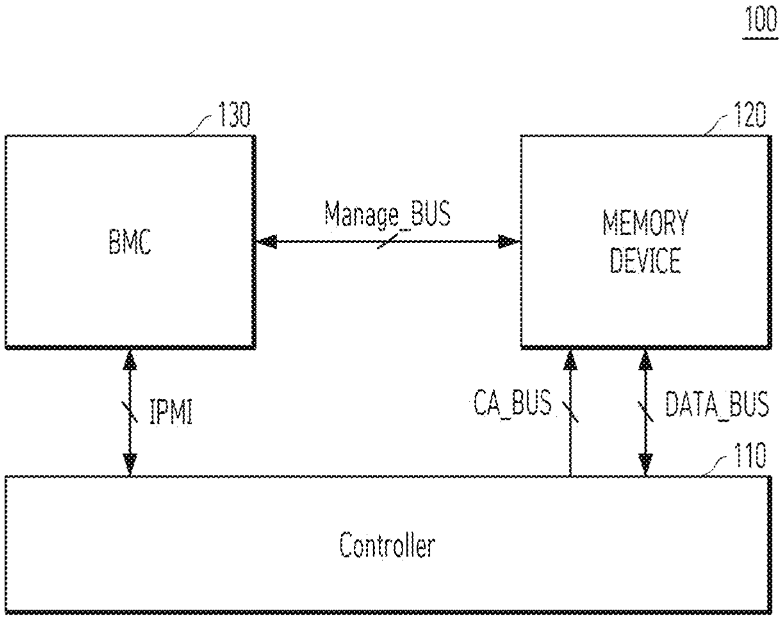
FIG. 1 is a diagram illustrating a construction of a memory system according to an embodiment of the present disclosure.

FIG. 1 is a diagram illustrating a construction of a memory system according to an embodiment of the present disclosure.

Referring to FIG. 1, a memory system 100 according to an embodiment of the present disclosure may include a controller 110, a memory device 120, and a baseboard management controller (BMC) 130.

The controller 110 may control an operation of the memory device 120. The controller 110 may be included within a processor, such as a central processing unit (CPU), a graphic processing unit (GPU), or an application processor (AP). The controller 110 may transmit a command and an address to the memory device 120 through a command address bus CA_BUS, and may transmit and receive data to and from the memory device 120 through a data bus DATA_BUS.

The memory device 120 may perform an operation that has been set by the controller 110. For example, the memory device 120 may perform a read operation or a write operation under the control of the controller 110. The memory device 120 may perform an operation that is indicated by the command and the address that are transmitted through the command address bus CA_BUS, and may transmit and receive data to and from the controller 110. For example, the memory device 120 may transmit data to the controller 110 through the data bus DATA_BUS after the start of a read operation, and may receive data that are transmitted through the data bus DATA_BUS after the start of a write operation. That is, the memory device 120 may distinguish between a read operation and a write operation based on the command and the address that are transmitted through the command address bus CA_BUS, may transmit, to the controller 110, data that have been stored in the memory device 120 through the data bus DATA_BUS after the start of the read operation, and may store, in the memory device 120, data that are received from the data bus DATA_BUS after the start of the write operation.

The BMC 130 may perform management and monitoring functions that are mounted on a basic board of a device, such as a server or a PC. The BMC 130 may communicate with the memory device 120, and may manage circuits within the memory device 120. Further, the BMC 120 may communicate with the controller 110, may check the state of the memory system 100, and may manage the memory system 100 or diagnose a problem thereof. For example, the BMC 130 may manage internal circuits within the memory device 120. An interface called an intelligent platform management interface (IPMI) may be basically used for communication between the BMC 130 and the controller 110. The communication between the BMC 130 and the memory device 120 may be performed through a management bus Manage_BUS. A memory module management control (M3C) interface that is similar to an inter-integrated circuit (I2C) interface may be used as the management bus Manage_BUS.

The command address bus CA_BUS and the data bus DATA_BUS between the controller 110 and the memory device 120 may each be a bus that is used to perform a main function of the memory device 120, such as a read or write operation. Accordingly, such an interface may be called an in-band interface. In this case, an external chip selection signal CS_e, an external clock CLK_e, an external command address signal CA_e, and data DQ may be transmitted and received through the in-band interface. Specifically, the external chip selection signal CS_e, the external clock CLK_e, and the external command address signal CA_e may be received through the command address bus CA_BUS. The data DQ may be transmitted and received through the data bus DATA_BUS. Furthermore, the management bus Manage_BUS between the BMC 130 and the memory device 120 may be used for additional control or management of the memory device 120. Accordingly, such an interface may be called a side-band interface. In this case, the management clock SCL and the management control signal SCA may be transmitted and received through the side-band interface, that is, the management bus Manage_BUS.

The memory system 100 constructed as described above according to an embodiment of the present disclosure may perform the following operation of the memory device 120 switching from the power-off state to the active state.

When a bootup operation is performed on the memory system 100, the controller 110, the memory device 120, and the BMC 130 may each perform a bootup operation according to a set sequence. In this case, while the controller 110 performs the bootup operation according to the set sequence, the BMC 130 may perform an operation of changing, into the active state, the state of set internal circuits within the memory device 120. Furthermore, the BMC 130 may perform an operation of changing, into the active state, the state of the memory device 120 that has entered the standby state, for example, a self-refresh state.

A construction and operation of the memory device that operates as described above and that is included in the memory system according to an embodiment of the present disclosure may be described as follows with reference to FIGS. 2 to 4.

Figure 2:
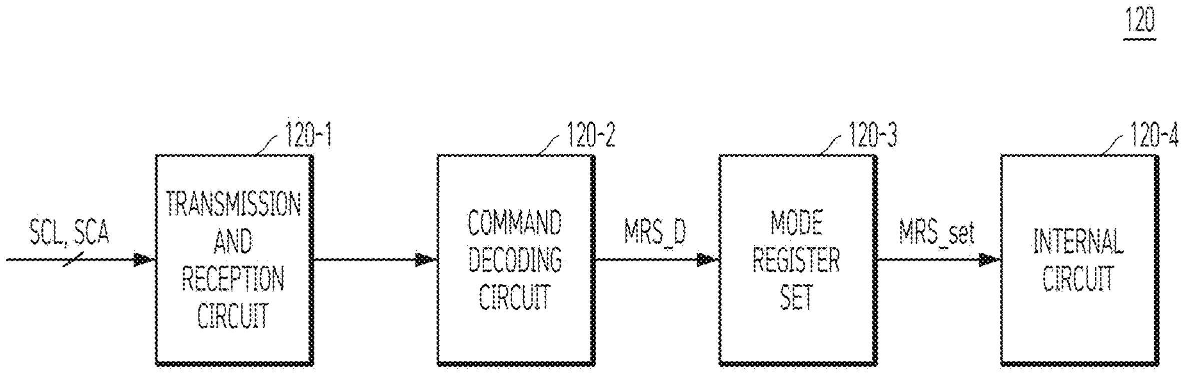
FIG. 2 is a diagram illustrating a construction of a memory device according to an embodiment of the present disclosure.

FIG. 2 is a diagram illustrating a construction of a memory device according to an embodiment of the present disclosure.

Referring to FIG. 2, the memory device 120 may include a transmission and reception circuit 120-1, a command decoding circuit 120-2, a mode register set 120-3, and an internal circuit 120-4.

The transmission and reception circuit 120-1 may receive a management clock SCL and a management control signal SCA from the BMC 130 through the side-band interface and transmit the received management clock SCL and management control signal SCA. For example, the transmission and reception circuit 120-1 may receive the management clock SCL and the management control signal SCA from the BMC 130 through the side-band interface, and may transmit the management clock SCL and the management control signal SCA to the command decoding circuit 120-2.

The command decoding circuit 120-2 may generate a setting command MRS_D based on the management clock SCL and management control signal SCA of the BMC 130 that are transmitted by the transmission and reception circuit 120-1. The command decoding circuit 120-2 may transmit the generated setting command MRS_D to the mode register set 120-3.

The mode register set 120-3 may receive the setting command MRS_D from the command decoding circuit 120-2, and may transmit, to the internal circuit 120-4, at least one setting signal MRS_set that has been stored in the mode register set 120-3. In this case, the setting signal MRS_set may include setting information of the internal circuit 120-4, which is necessary after the start of a bootup operation.

The internal circuit 120-4 may receive the setting signal MRS_set from the mode register set 120-3, and may be set based on the received setting signal MRS_set. For example, the internal circuit 120-4 may include an on-die termination (ODT) circuit. When the internal circuit 120-4 includes the ODT circuit, the ODT circuit of the memory device 120 may receive ODT setting information that has been stored in the mode register set 120-3 through the side-band interface after the start of a bootup operation. Accordingly, the ODT circuit of the memory device 120 may be set based on ODT setting information that has been stored in the mode register set 120-3 regardless of a bootup operation of the controller 110. Therefore, the ODT circuit of the memory device 120 may be set before the bootup operation of the controller 110 is completed.

The internal circuit 120-4 may include a self-refresh control circuit. The memory device 120 that has entered a self-refresh mode may transmit setting information that has been stored in the mode register set 120-3, for example, a self-refresh termination signal to the self-refresh control circuit through the side-band interface. Accordingly, the memory device 120 may terminate the self-refresh mode regardless of the controller 110.

As described above, the memory device 120 according to an embodiment of the present disclosure may be basically controlled by the controller 110, but may manage an internal circuit (e.g., the ODT circuit or the self-refresh circuit) that has been set by control of the BMC 130 through the side-band interface regardless of the controller 110 after the start of a bootup operation or in the standby state.

Figure 3:
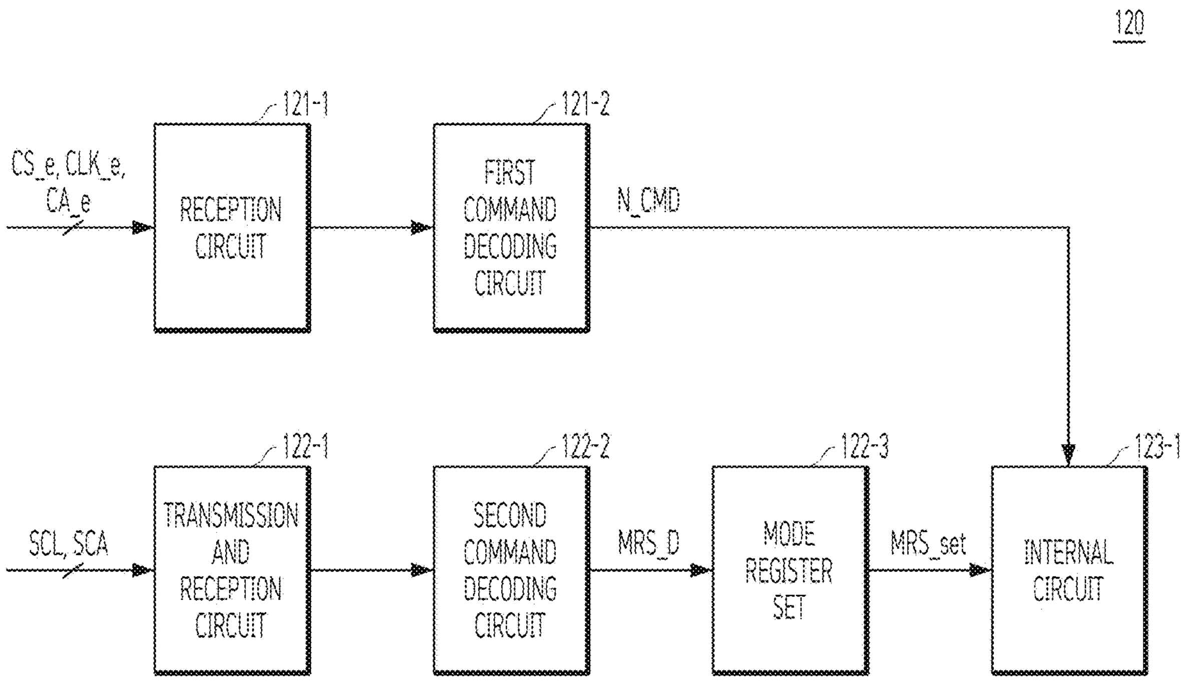
FIG. 3 is a diagram illustrating a construction of a memory device according to another embodiment of the present disclosure.

FIG. 3 is a diagram illustrating a construction of a memory device according to another embodiment of the present disclosure.

Referring to FIG. 3, the memory device 120 may include a reception circuit 121-1, a first command decoding circuit 121-2, a transmission and reception circuit 122-1, a second command decoding circuit 122-2, a mode register set 122-3, and an internal circuit 123-1.

The reception circuit 121-1 may receive, from the controller 110, the external chip selection signal CS_e, the external clock CLK_e, and the external command address signal CA_e through the in-band interface. The reception circuit 121-1 may transmit, to the first command decoding circuit 121-2, the external chip selection signal CS_e, the external clock CLK_e, and the external command address signal CA_e.

The first command decoding circuit 121-2 may generate a normal command N_CMD by receiving at least one of the external chip selection signal CS_e, external clock CLK_e, and external command address signal CA_e of the controller 110, which are transferred by the transmission and reception circuit 121-1. For example, the first command decoding circuit 121-2 may generate the normal command N_CMD by decoding at least one of the external chip selection signal CS_e, the external clock CLK_e, and the external command address signal CA_e that are transferred by the transmission and reception circuit 121-1. In an embodiment, when the internal circuit 123-1 to which the normal command N_CMD is provided includes a self-refresh control circuit, the normal command N_CMD may include a self-refresh entry command.

The transmission and reception circuit 122-1 may receive the management clock SCL and the management control signal SCA from the BMC 130 through the side-band interface, and transmit the management clock SCL and the management control signal SCA. For example, the transmission and reception circuit 122-1 may receive, from the BMC 130, the management clock SCL and the management control signal SCA through the side-band interface, and may transmit the management clock SCL and the management control signal SCA to the second command decoding circuit 122-2.

The second command decoding circuit 122-2 may generate a setting command MRS_D based on the management clock SCL and management control signal SCA of the BMC 130, which are transferred by the transmission and reception circuit 122-1. The second command decoding circuit 122-2 may transmit the generated setting command MRS_D to the mode register set 122-3. The setting command MRS_D may include a termination command in the self-refresh mode.

The mode register set 122-3 may receive the setting command MRS_D and may transmit, to the internal circuit 123-1, at least one setting signal MRS_set that has been stored in the mode register set 122-3. In an embodiment, when the internal circuit 123-1 to which the setting signal MRS_set is provided includes a self-refresh control circuit, the setting signal MRS_set may include information that is necessary for the termination of the self-refresh mode.

The internal circuit 123-1 may receive the setting signal MRS_set, and may be set based on the received setting signal MRS_set. For example, the internal circuit 123-1 may include a self-refresh control circuit. The memory device 120 that has entered the self-refresh mode may transmit, to the self-refresh control circuit, the setting information MRS_ set that has been stored in the mode register set 122-3, for example, a self-refresh termination signal, through the side-band interface. Accordingly, the memory device 120 may terminate the self-refresh mode regardless of the controller 110.

As described above, the memory device 120 according to an embodiment of the present disclosure may be basically controlled by the controller 110, but may manage an internal circuit (e.g., the self-refresh control circuit) that has been set by control of the BMC 130 through the side-band interface regardless of the controller 110 when the memory device 120 operates in the standby state, for example, the self-refresh mode. For example, FIG. 3 may illustrate a construction in which the memory device 120 enters the standby state through the in-band interface and the memory device 120 in the standby state switches to the active state through the side-band interface.

Figure 4:
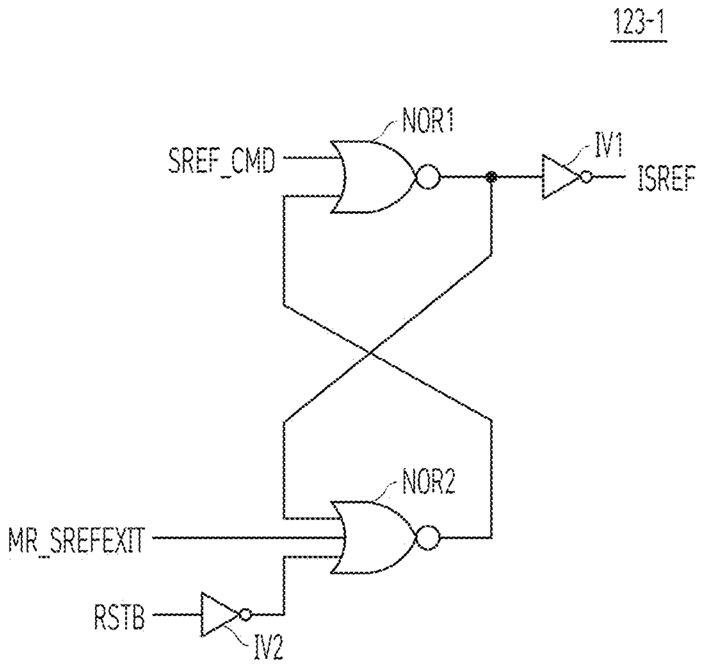
FIG. 4 is a diagram illustrating a construction of an internal circuit of the memory device according to an embodiment of the present disclosure.

FIG. 4 is a diagram illustrating a construction of the internal circuit of the memory device according to an embodiment of the present disclosure. In this case, FIG. 4 may illustrate a case in which the internal circuit 123-1 includes a self-refresh control circuit.

Referring to FIG. 4, the internal circuit 123-1 may include a first NOR gate NOR1, a first inverter IV1, a second inverter IV2, and a second NOR gate NOR2.

A self-refresh entry command SREF_CMD and the output of the second NOR gate NOR2 may be input to the first NOR gate NOR1. In this case, the normal command N_CMD of the first command decoding circuit 121-2 in FIG. 3 may include the self-refresh entry command SREF_CMD.

The first inverter IV1 may output a self-refresh signal ISREF by receiving and inverting the output of the first NOR gate NOR1.

The second inverter IV2 may receive a resetting signal RSTB and output the inverted resetting signal RSTB to the second NOR gate NOR2.

The second NOR gate NOR2 may receive a self-refresh termination signal MR_SREFEXIT, the output of the second inverter IV2, and the output of the first NOR gate NOR1. The output of the second NOR gate NOR2 may be input to the first NOR gate NOR1. In this case, the setting signal MRS_set of the mode register set 122-3 in FIG. 3 may include the self-refresh termination signal MR_SREFEXIT. Furthermore, the normal command N_CMD of the first command decoding circuit 121-2 in FIG. 3 may include the resetting signal RSTB.

The internal circuit 123-1 of the memory device 120 constructed as described above according to an embodiment of the present disclosure, that is, the self-refresh control circuit, may enable the self-refresh signal ISREF until the internal circuit 123-1 receives the resetting signal RSTB or the self-refresh termination signal MR_SREFEXIT, when receiving the self-refresh entry command SREF_CMD. For example, the self-refresh control circuit may enable the self-refresh signal ISREF to a particular level (e.g., a high level) when receiving the self-refresh entry command SREF_CMD having a particular level (e.g., a high level). Furthermore, the self-refresh control circuit may maintain the self-refresh signal ISREF that has been enabled, until the self-refresh control circuit receives the resetting signal RSTB having a particular level (e.g., a high level) or the self-refresh termination signal MR_SREFEXIT having a particular level (e.g., a high level). That is, the self-refresh control circuit may disable the self-refresh signal ISREF that has been enabled to a particular level (e.g., a low level), when receiving the resetting signal RSTB having a particular level (e.g., a high level) or the self-refresh termination signal MR_SREFEXIT having a particular level (e.g., a high level).

As a result, when the internal circuit of the memory device 120 according to an embodiment of the present disclosure includes the self-refresh control circuit, the self-refresh control circuit may enable the memory device 120 to enter the self-refresh mode by enabling the self-refresh signal ISREF through the in-band interface. Furthermore, the self-refresh control circuit may terminate the self-refresh mode of the memory device 120 by disabling the self-refresh signal ISREF through the side-band interface. Furthermore, the memory device 120 according to an embodiment of the present disclosure may terminate the self-refresh mode by disabling the self-refresh signal ISREF by enabling the resetting signal RSTB through the in-band interface in the state in which the memory device 120 has entered the self-refresh mode.

Figure 5:
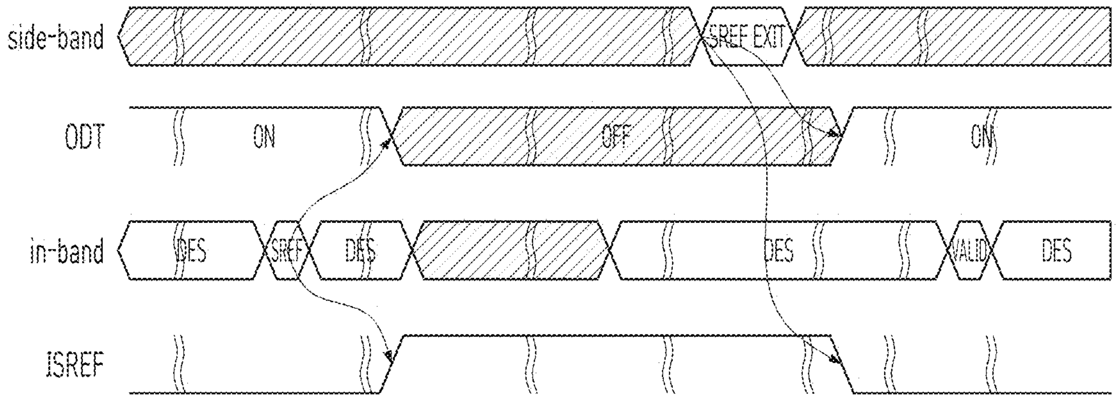
FIG. 5 is a timing diagram for describing an operation of the memory device according to an embodiment of the present disclosure.

FIG. 5 is a timing diagram for describing an operation of the memory device according to an embodiment of the present disclosure. In this case, it is illustrated that the internal circuit 123-1 of FIG. 3 may include the ODT circuit and the self-refresh control circuit.

Referring to FIG. 5, the memory device 120 may enter the self-refresh mode through the in-band interface. When the memory device 120 enters the self-refresh mode, the ODT circuit may become off, and the self-refresh signal ISREF may be enabled to a high level. Furthermore, as the ODT circuit becomes off, at least one reception circuit for receiving the signals of the in-band interface may be deactivated.

This may be described in detail with reference to FIG. 3. The memory device 120 may enter the self-refresh mode based on the normal command N_CMD that is generated by decoding the signals CS_e, CLK_e, and CA_e that are received from the controller 110 through the in-band interface. In this case, the normal command N_CMD may include the self-refresh entry command SREF_CMD. Furthermore, when the internal circuit 123-1 includes the ODT circuit, the ODT circuit may become off. When the internal circuit 123-1 includes the self-refresh control circuit, the self-refresh control circuit may enable the self-refresh signal ISREF. In this case, as the ODT circuit becomes off, the reception circuit 121-1 may be deactivated.

The memory device 120 that has entered the self-refresh mode may generate the setting command MRS_D by decoding the signals SCL and SCA that have been received from the BMC 130 through the side-band interface. The mode register set 122-3 that has received the generated setting command MRS_D may output, as the setting signal MRS_set, setting information that has been stored in the mode register set 122-3. When the internal circuit 123-1 includes the ODT circuit, the ODT circuit may become on based on the setting signal MRS_set, and may perform an ODT operation based on the setting information included in the setting signal MRS_set. At this time, as the ODT circuit becomes on, the reception circuit 121-1 may be activated. When the internal circuit 123-1 includes the self-refresh control circuit, the self-refresh control circuit may disable the self-refresh signal ISREF that has been enabled, based on the setting signal MRS_set.

That is, the memory device according to an embodiment of the present disclosure may enter the standby state, for example, the self-refresh state through the in-band interface, and may switch from the standby state, that is, the self-refresh state to the active state through the side-band interface. From a viewpoint of the reception circuit 121-1, the reception circuit 121-1 may be deactivated when the memory device 120 enters the self-refresh mode through the in-band interface, and the reception circuit 121-1 may be activated when the self-refresh mode is terminated through the side-band interface.

FIGS. 2 and 3 are diagrams describing that the memory device 120 according to an embodiment of the present disclosure transmits setting information that has been stored in the mode register set 120-3 or 122-3 to the internal circuit 120-4 or 123-1 as the setting signal MRS_set through the side-band interface. Furthermore, FIGS. 3 and 5 are each a diagram describing the internal circuit 123-1 of the memory device 120 according to an embodiment of the present disclosure, which is controlled by signals that are provided through the in-band interface and signals that are provided through the side-band interface.

Accordingly, the memory device 120 according to an embodiment of the present disclosure can perform an initial setting operation by activating the internal circuit 120-4 through the side-band interface without control of the controller 110 after the start of a bootup operation. Furthermore, the memory device 120 according to an embodiment of the present disclosure can enter the standby state through the in-band interface, and can switch from the standby state to the active state through the side-band interface.

Although embodiments according to the technical spirit of the present disclosure have been described above with reference to the accompanying drawings, the embodiments have been provided to merely describe embodiments according to the concept of the present disclosure, and the present disclosure is not limited to the embodiments. A person having ordinary knowledge in the art to which the present disclosure pertains may substitute, modify, and change the embodiments in various ways without departing from the technical spirit of the present disclosure written in the claims. Such substitutions, modifications, and changes may be said to belong to the scope of the present disclosure. Furthermore, the embodiments may be combined to form additional embodiments.

What is claimed is:

1. A memory system comprising:

a memory device;

a controller configured to control the memory device through an in-band interface; and a baseboard management controller configured to control the memory device through a side-band interface, wherein the memory device is configured to enter a self-refresh mode based on in-band signals that are received through the in-band interface and to terminate the self-refresh mode based on side-band signals that are received through the side-band interface, and wherein a reception circuit is activated on termination of the self-refresh mode.

2. The memory system of claim 1, wherein the in-band signals comprise an external chip selection signal, an external clock, and an external command address signal.

3. The memory system of claim 2, wherein the memory device generates, as a setting signal, setting information that has been stored in a mode register set based on the side-band signals.

4. The memory system of claim 3, wherein the memory device controls at least one internal circuit to be on based on the setting signal and enables an operation of setting the internal circuit to be performed based on the setting signal.

5. The memory system of claim 3, wherein the memory device comprises an internal circuit configured to disable a self-refresh signal that has been enabled based on the setting signal.

6. A memory device comprising:

a reception circuit configured to receive in-band signals from a controller through an in-band interface;

a first command decoding circuit configured to generate a normal command by decoding an output of the reception circuit;

a transmission and reception circuit configured to transmit and receive side-band signals to and from a baseboard management controller through a side-band interface;

a second command decoding circuit configured to generate a setting command by decoding an output of the transmission and reception circuit;

a mode register set configured to store setting information based on the setting command and output, as a setting signal, the stored setting information; and at least one internal circuit configured to operate based on the normal command and the setting signal.

7. The memory device of claim 6, wherein:

the internal circuit comprises an on-die termination (ODT) circuit, and the ODT circuit becomes on based on the setting signal after a start of a bootup operation and performs an ODT operation based on the setting signal.

8. The memory device of claim 6, wherein:

the in-band signals comprise an external chip selection signal, an external clock, and an external command address signal, and the normal command comprises a self-refresh entry command.

9. The memory device of claim 8, wherein the internal circuit becomes off or enters a standby state based on the normal command.

10. The memory device of claim 9, wherein:

the internal circuit comprises an on-die termination (ODT) circuit, and the ODT circuit becomes off when receiving the self-refresh entry command, and becomes on and performs an ODT operation when receiving the setting signal.

11. The memory device of claim 9, wherein:

the internal circuit comprises a self-refresh control circuit, and the self-refresh control circuit enables a self-refresh signal when receiving the self-refresh entry command and disables the self-refresh signal when receiving the setting signal.

12. An operating method of a memory device, the operating method comprising:

entering a standby state based on in-band signals that are received through an in-band interface;

generating a setting command by decoding side-band signals that are received through a side-band interface;

outputting setting information that has been stored in a mode register set based on the setting command; and switching from the standby state to an active state and terminating a self-refresh mode based on the setting information.

13. The operating method of claim 12, wherein the switching from the standby state to the active state comprises:

disabling a self-refresh signal that has been enabled based on the setting information; and performing an on-die termination (ODT) operation based on the setting information.

14. The operating method of claim 12, wherein entering the standby state comprises:

disabling a self-refresh signal; and terminating an on-die termination (ODT) operation.

15. An operating method of a memory device, the operating method comprising:

entering a self-refresh mode based on in-band signals that are received through an in-band interface;

deactivating at least one reception circuit for receiving the in-band signals based on entering the self-refresh mode;

receiving a termination command in the self-refresh mode through a side-band interface;

activating the reception circuit that has been deactivated in response to the reception of the termination command; and terminating the self-refresh mode in response to the termination command.

16. The operating method of claim 15, wherein the deactivating of the reception circuit comprises deactivating the reception circuit by an on-die termination (ODT) circuit becoming off based on entering the self-refresh mode.

17. The operating method of claim 16, wherein the activating of the reception circuit comprises activating the reception circuit by the on-die termination (ODT) circuit becoming on in response to the termination command.

* * * * *